United States Patent [19]

Zinimon

[11] Patent Number: 4,486,254

[45] Date of Patent: Dec. 4, 1984

[54] HEAT-ACTIVATED PATCH OR REPAIR COMPOSITION AND SYSTEM FOR METAL

[76] Inventor: Oliver Zinimon, 1495 W. River Rd. South, Elyria, Ohio 44035

[21] Appl. No.: 448,696

[22] Filed: Feb. 3, 1983

[51] Int. Cl.$^3$ .............................................. B32B 35/00
[52] U.S. Cl. .................................... 156/94; 29/402.09; 106/84; 156/325; 428/271; 428/443; 428/703
[58] Field of Search .......................... 29/402.09, 402.11; 106/84; 156/94, 325; 428/443, 271, 703

[56] References Cited

U.S. PATENT DOCUMENTS

| | | | |
|---|---|---|---|
| 2,946,395 | 7/1960 | Overland | 156/94 X |
| 3,531,345 | 9/1970 | Torosian | 156/94 |
| 3,959,063 | 5/1976 | Hawthorne | 106/84 X |

*Primary Examiner*—Robert Dawson
*Attorney, Agent, or Firm*—Gustalo Nunez; Joseph Patrick Burke

[57] ABSTRACT

This disclosure is directed to a heat-activated patch or repair composition for metal object or surface capable of maintaining its shape at the temperatures to which it is heated to activate and set the composition and ranging from about 250° to about 500° F. comprising a preponderant concentration of a fibrous adhesive containing silicate, soda and asbestos fibrous cement, and lesser concentrations of iron ore and an alumina-containing air set mortar having Pier test of about 600 to about 800 p.s.i. and comprised of alumina, clay and grog (ground-up fired clay). The aforementioned heat-activated patch or repair composition is utilized in a system for repairing such metal object or surface by intimately associating said composition with asbestos cloth, preferably woven asbestos cloth, by applying said composition to one surface of said asbestos cloth and then wrapping the adhesive composition surface of the woven asbestos cloth around the exterior of the metal object or surface to be repaired. In place of wrapping, said repair system can be applied in overlapping fashion using strips thereof to cover the hole or crack in the surface to be repaired. Then the patch or repair system is heat activated by heating from the opposite surface, viz., the surface opposite to which the patch has been applied, to temperatures ranging from about 250° to about 500° F., and more usually temperatures of about 300° to about 400° F., for a sufficient period of time to activate and set said repair system.

10 Claims, No Drawings

HEAT-ACTIVATED PATCH OR REPAIR COMPOSITION AND SYSTEM FOR METAL

BACKGROUND OF THE INVENTION AND PRIOR ART

Prior to this invention, when cracks or holes developed in vehicle mufflers, tailpipes, manifolds, etc., it was customary to replace the component which had the leak and/or hole. The enactment of anti-noise ordinances and statutes reduce the time over which such leaks and holes could be tolerated. Those types of make-do devices were utilized by vehicle owners to extend the period of time of the costly replacement of the leaky muffler, tailpipe, manifold, etc. For example, tin cans were cut, flattened and then roughly formed to accommodate the general contour of the surface containing the leak, hole, etc., followed by bolting or otherwise mechanically securing the mechanical-type patch in place. Unfortunately, however, such repair attempts were generally non-productive and could not withstand the high temperatures to which they were subjected by the vehicle exhaust gases traveling through the exhaust system. Attempts were also made to weld repair metal pieces to the exhaust system component having the leaks or holes. While these were secured better to such component(s), the availability of welding equipment and the necessary skill to permit its safe use were not available to the general motoring public. Accordingly, there has long been an unfulfilled need for an inexpensive and easily applied patch or repair composition and system for such metal objects and surfaces, particularly a patch or repair composition and system which can be both safely and easily applied to the work piece to be repaired and which will stay in place to permit normal function of the component being repaired.

U.S. Pat. No. 2,107,588 to J. L. Smith represents a mechanical-type repair system and is directed to a muffler repair jacket of two longitudinally split sections adapted for overlapped engagement with each other at their inner ends for longitudinal adjustments and adapted to overlap at their contiguous longitudinal edges for lateral adjustment and clamping bands for securing the sections of the repair jacket in close engagement with the muffler casing. Asbestos rope can be used as packing to aid in fitting the Smith muffler repair jacket to mufflers having plain ends.

U.S. Pat. No. 2,237,745 to J. R. Musgrave discloses a metal corrosion-inhibiting thermal insulating cement comprising a substantially neutral mineral wool, asbestos, bentonite, trisodium phosphate and sodium nitrite. Sufficient water can be added to give the mass a plasticity suitable for application to the surface to be insulated. Upon drying in air, a porous layer is formed by means of which its insulating value is obtained.

I. Harter, et al, U.S. Pat. No. 2,674,539 is concerned with the provision of improved refractory fibers by the melting of alumina-silica refractory materials, such as fireclays, kaolin, bauxite, kyanite, sillimanite and topaz, having a fusion point in the range of 2900° to 3350° F. Such fibers are reported to yield a mineral wool having a permissible maximum use temperature above 2000° F., a very low alkali content, high flexibility and strength, low thermal conductivity and high resistance to water vapor attack at high temperatures.

J. C. McMullen, U.S. Pat. No. 2,710,261 is directed to inorganic oxidic compositions in fibrous form suitable for use as a thermal insulating or filtering material, said compositions containing various specified concentrations of silica, alumina, titania, and oxides of calcium, magnesium, boron and iron. The McMullen compositions are disclosed as containing less percentage of pellets or non-fibrous material such as would interfere with the insulating properties of mineral fibres formed from such compositions.

DETAILED DESCRIPTION OF THE INVENTION

The present invention is directed to a heat-activated patch or repair composition and system for a metal object or surface capable of maintaining its shape at the temperatures to which it is heated to activate and set the composition, such temperatures ranging from about 250° to about 500° F., comprising a preponderance of a fibrous adhesive containing silicate, soda and asbestos fibrous cement, and lesser concentrations of ironore and an alumina-containing air set mortar having a Pier test of about 600 to 800 p.s.i. and comprised of alumina, clay and grog (groundup fired clay). The foregoing heat-activated composition is employed in conjunction with asbestos cloth, such as, woven asbestos cloth, to provide a comparatively permanent patch or repair in such metal object and surface.

The patch or repair system of this invention can be readily applied to a properly prepared metal object or surface and thereafter heated from the opposite surface to which said repair system is applied to temperatures ranging from about 250° to about 500° F. The metal object or surface to be repaired can be prepared for application of the present repair system by thoroughly cleaning rust, dirt and other substances from the area to be patched or repaired. A wire brush or sandpaper or a combination of both can be employed for the cleaning process. The component or object to be repaired should be isolated from extraneous water, moisture, etc., until the repair composition and system have been applied thereto and heated to activate and set the adhesive contained therein.

After cleaning, the patch and repair composition of this invention is applied to woven asbestos cloth. At the time of its application, said patch or repair composition has sufficient plasticity to present a tacky consistency which readily adheres to the non-damaged surface or area of the component or object being repaired. After spreading said composition onto the woven asbestos cloth, the cloth is wrapped or applied to the patch hole in overlapping fashion such that one adhesive-containing edge thereof overlaps upon another until the crack or hole is completely covered therewith. Then the heat is supplied from the surface opposite to that to which the repair system has been applied. This is readily accomplished when repairing exhaust system components for vehicles, such as mufflers, tail and exhaust pipes, manifolds, etc., by running the vehicle engine for from about 10 to 20 minutes, e.g., 15 minutes, in order to activate and set the composition. It will be noted that in such cases the person making such repair is isolated from the aforementioned high temperatures used to activate and set the adhesive so as to eliminate burn injuries. After such heating to activate and set the adhesive, the asbestos cloth becomes part of the patch and remains on the repaired component. Since the adhesive and woven asbestos cloth are in intimate association by application of the adhesive to the woven asbestos fibrous cloth, after the heating process has been finished, the activated adhesive and the woven cloth are in such intimate association that they are virtually a continual layer substantially conforming in contour or shape to the exterior surface to which the patch or repair system is applied.

While the foregoing description has referred to the use of the patch or repair system of this invention in conjunction with vehicle exhaust systems, it can clearly be employed in any exhaust system or to repair any metal object or surface where the heat can be applied from the surface opposite to that to which the patch is applied and in any component or pipe having one end open for access to the atmosphere, either directly or indirectly. Thus, for example, the present repair system is suitable for use to repair cracks or holes in steam pipes, catalytic converters, etc. When applying said repair composition and system for the repair of steam pipes, the steam is first drained from the pipes and the repair system applied thereto in conjunction with heating to temperatures of about 300° to 400° F. in order to activate and set the adhesive. A further advantage attendant to the use of the repair composition and systems of this invention is that once heat activated, such repairs are capable of withstanding temperatures of up to about 2000° F. and even beyond before significant deterioration thereof occurs.

Compositionally, the heat-activated patch or repair compositions utilized in accordance with this invention are comprised of a preponderant concentration of a fibrous adhesive containing silicate, soda and asbestos fibrous cement with lesser concentrations of ironore and an alumina-containing air set mortar having a Pier test of about 600 to 800 p.s.i., said mortar being comprised of alumina, clay and grog. Usually, however, said mortar ranges from about 1% to 7% by weight of the total patch or repair composition, the ironore usually ranges about 7 to 13 weight percent thereof, with the remaining concentration of about 80 to about 92 weight percent being the fibrous adhesive containing silicate, soda and asbestos fibrous cement. The ironore component can be comprised of a mixture of ironoxides, e.g., including any two or more of $FeO, Fe_2O_3, Fe_3O_4$, etc. Preferably, said patch or repair composition contains from about 3 to about 5 weight percent of said air set mortar, from about 8 to about 12 weight percent of said ironore and from about 83 to about 89 weight percent of said fibrous adhesive.

It will be observed from the preceeding description, that the patch or repair system of this invention is activated by heating it in situ on the object being repaired with the heat being applied from the surface opposite to that to which the repair or patch system has been applied. Upon heating at the requisite temperatures ranging from about 250° to about 500° F., and more usually from about 300° to 400° F., for time periods ranging from about 10 to 20 minutes and more usually about 15 minutes, the patch or repair is present as a unitary body of adhesive and asbestos woven cloth which substantially conforms in contour to the metal object or surface to which it has been applied. The ability of the patch or repair system of this invention to conform substantially to curved surfaces such as are present in vehicle mufflers, catalytic converters, exhaust pipes, tailpipes, etc., is another significant advantage to the present invention and it will be observed that not only is the present invention readily capable of being applied in conformation therewith, but also that upon activation of the adhesive portion, the repair system is set or stabalized to such conforming contour.

The invention will be described in further detail in accordance with the following example.

EXAMPLE

A batch of heat-activated patch or repair composition in accordance with this invention weighing approximately 50 pounds was prepared by mixing 2 pounds of "Freeport Super 3000 Mortar", 5 pounds of ironore and the remaining 43 pounds of "Johns Manville Fibrous Adhesive". "Freeport Super 3000 Mortar" is an alumina-filled air set mortar having a Pier test of about 700 p.s.i. and comprised of alumina, clay and grog (ground-up fired clay) and is available from the Freeport Brick Company, Specialty Division, of Freeport, Pa. "Johns Mansville Fibrous Adhesive" is likewise a commercially available material and contains silicate, soda and asbestos fibrous cement.

The three aforementioned components are added to a mixer capable of mixing the 50 pound batch and are mixed together for approximately 30 minutes. The resulting mix has a pasty consistency and contains an oily substance which appears to have been present in the fibrous adhesive.

The freshly prepared patch or repair composition is then spooned onto commercially available woven asbestos cloth obtained from the Johns Mansville Corporation and promptly applied to a wire-brush cleaned muffler having a hole therein. The heat activatable repair system comprised of the woven asbestos cloth and the repair composition is applied with the adhesive composition side in contact with the exterior surface of the muffler by wrapping same in overlapping fashion until the hole is covered with overlapping cloth-adhesive on all extremeties of said hole. Then the automobile engine is started and run for approximately 15 minutes in order to activate the adhesive and set the repair system.

Repairs have been made on automobile exhaust system tailpipes and manifolds in the same manner as described above in Example 1 with basically the same results. It has been observed that during the heating stage when the automobile engine is turned on, temperatures of approximately 350° F. or more have been supplied to the exhaust system component from the interior surface, viz., the surface opposite to that to which the patch or repair system has been applied for periods of approximately 15 minutes.

It has been demonstrated that an inexpensive, readily applied and safely applied repair composition and system has been provided by the present invention, which system enables the repair of leaky mufflers, tailpipes and other exhaust components which contain cracks or holes therein, thus saving the consumer the expense of replacing such components.

I claim:

1. A heat-activated patch or repair composition for a metal object or surface capable of maintaining its shape at the temperatures to which it is heated to activate and set the composition, said composition comprising a preponderant concentration of a fibrous adhesive containing silicate, soda and asbestos fibrous cement and lesser concentrations of ironore and an alumina-containing air set mortar having a Pier test of about 600 to 800 p.s.i. and comprised of alumina, clay and grog.

2. A composition as in claim 1 wherein the Pier test rating of said mortar is about 700 p.s.i.

3. A heat-activated patch or repair system for a metal surface or object capable of maintaining its shape at a temperature of about 500° F., comprising the composition of claim 1 in association with asbestos cloth.

4. A system as in claim 3 wherein said asbestos cloth is woven asbestos cloth.

5. A heat activated patch or repair system as in claim 4 comprising from about 1 to about 7 weight percent of an alumina-containing air set mortar having a Pier test of about 600 to about 800 p.s.i. and comprised of alumina, clay and grog; from about 7 to about 13 weight percent of ironore and from about 80 to about 92 weight percent of a fibrous adhesive containing silicate, soda and asbestos fiber cement in intimate association with woven asbestos cloth.

6. A method for patching or repairing cracks or holes in a metal surface or object capable of maintaining its shape at a temperature of about 500° F., comprising applying to said metal surface or object the heat-activated patch or repair system of claim 4 and then heating the opposite surface thereof to temperatures ranging from about 250° to about 500° F. for a sufficient period of time to activate said composition and set said system.

7. A method as in claim 6 wherein said opposite surface is heated to a temperature ranging from about 300° to about 400° F.

8. A method as in claim 7 wherein said application and heating are conducted in the substantial absence of atmospherically extraneous water.

9. A heat-activated patch or repair system for a metal surface or object capable of maintaining its shape at a temperature of about 500° F., comprising from about 3 to about 5 weight percent of an alumina-containing air set mortar comprised of alumina, clay and grog and having a Pier test of about 700 p.s.i., from about 8 to about 12 weight percent of ironore and from about 83 to about 89 weight percent of a fibrous adhesive comprising silicate, soda and asbestos fibrous cement in intimate association with asbestos cloth.

10. A heat-activated patch or repair system as in claim 9 wherein said asbestos cloth is woven.

* * * * *